United States Patent [19]
Schutte et al.

[11] Patent Number: 5,443,166
[45] Date of Patent: Aug. 22, 1995

[54] STORAGE RACK FOR USE WITH A BREAK PRESS

[76] Inventors: John H. Schutte, 5525 Sidney Rd., Cincinnati, Ohio 45238; Walt L. Wurzelbacher, 2459 Joyce La., Okeana, Ohio 45053

[21] Appl. No.: 149,522

[22] Filed: Nov. 9, 1993

[51] Int. Cl.⁶ ............................................. A47F 3/06
[52] U.S. Cl. ................................ 211/70.6; 248/669; 108/147; 211/163; 211/166
[58] Field of Search ............... 211/70.6, 128, 144, 211/163, 174, 182, 207, 166, 1.52, 1.53, 1.55; 248/669, 404; 108/141, 144, 147; 414/744.3, 744.7

[56] References Cited

U.S. PATENT DOCUMENTS

| | | | |
|---|---|---|---|
| 1,981,680 | 11/1934 | Tindale | 254/6 |
| 2,762,513 | 9/1956 | Zaninovich | 211/1.6 |
| 2,972,420 | 2/1961 | Tucci | 211/95 |
| 3,282,439 | 11/1966 | Vitale | 211/131 |
| 3,679,065 | 7/1972 | Aurtemma | 312/312 |
| 3,966,052 | 6/1976 | Knaus | 211/60 |
| 4,014,437 | 3/1977 | Rumble et al. | 211/4 |
| 4,070,973 | 1/1978 | Morgan | 108/20 |
| 4,170,307 | 10/1979 | Maeder | 211/60 |
| 4,657,147 | 4/1987 | Le Mer | 211/58 |
| 4,736,856 | 4/1988 | Alneng et al. | 211/131 |
| 4,783,902 | 11/1988 | Novak | 29/568 |
| 5,031,779 | 7/1991 | Szenay et al. | 211/40 |

FOREIGN PATENT DOCUMENTS

| | | | |
|---|---|---|---|
| 0552451 | 7/1993 | European Pat. Off. | 108/144 |
| 2515948 | 5/1983 | France | 211/70.6 |
| 8800623 | 10/1989 | Netherlands | 108/147 |
| 633 | of 1880 | United Kingdom | 211/144 |
| 869748 | 6/1961 | United Kingdom | 211/144 |

Primary Examiner—Leslie A. Braun
Assistant Examiner—Catherine S. Collins
Attorney, Agent, or Firm—Charles R. Wilson

[57] ABSTRACT

A storage rack for use with a break press is capable of holding dies in a manner whereby each die can be readily transferred directly from the storage rack to the break press. The storage rack comprises a central shaft capable of vertical movement and a set of horizontal tiers fixedly secured to the central shaft to move vertically therewith and also to rotate therewith. Each tier has at least two support rails to hold dies. A die for use in the break press is positioned juxtaposed a die bolster of the break press by vertically moving the tier and revolving it. It is transferred readily by sliding it from the storage rack's support rail to the break press's die bolster.

15 Claims, 3 Drawing Sheets

STORAGE RACK FOR USE WITH A BREAK PRESS

This invention relates to a storage rack. More particularly, it relates to a break press storage rack wherein dies are stored and readily transferred to the break press when needed.

Break presses are used to convert metal workpiece blanks into formed articles with a contoured shape. Many industrial and commercial articles are formed in a break press. The break press basically uses a male die and a female die. The workpiece is positioned between the dies and then the dies are forced together under pressure to impart a shape to the workpiece. Most break presses in a plant are used to form several different articles. They are able to accomplish this due to their ability to receive different dies. Thus, for a changeover in workpieces, a set of dies are removed and replaced with a different set of dies.

It is common practice in plants that use break presses to have a storage rack for the dies. The particular dies when needed are simply removed from the rack, transported to the break press and installed. Recognizably, there is a certain inefficiency in changing dies in this manner. Additionally, many dies weigh several pounds and are bulky to load into and remove from the break press. Besides the possibility of the break press operator straining himself in any die set changeover, there is also the possibility of a die being damaged.

In accord with a need experienced in many industrial plants, there has now been developed a storage rack designed for use particularly with break presses. The storage rack is capable of holding several sets of dies in a manner whereby each set is readily transferred from the storage rack into the break press without having to be separately transported and handled. The storage rack is economical to produce and adds to the efficiency of the break press operator.

SUMMARY OF THE INVENTION

A storage rack for use with a break press is capable of holding a plurality of dies in position whereby they are readily transferred to a die bolster of the break press. The storage rack comprises a central shaft capable of vertical movement and a set of horizontal tiers fixedly secured to the central shaft for vertical movement therewith and further capable of rotational movement. Each tier has at least two support rails mounted thereon to slidably hold a die. Each die stored on the storage rack is capable of being positioned juxtaposed the die bolster of the break press by vertical and rotational movements of the tier. The die, once properly positioned, is slid from its support rail directly into the die bolster.

DETAILED DESCRIPTION OF THE INVENTION

The storage rack of the invention is particularly useful with break presses and this use is described in detail in the following paragraphs and with reference to the drawings. It should be understood, however, the storage rack is useful for storing dies used on other types of industrial equipment. These uses of the storage rack are contemplated, though are not described in detail.

Figure 1:
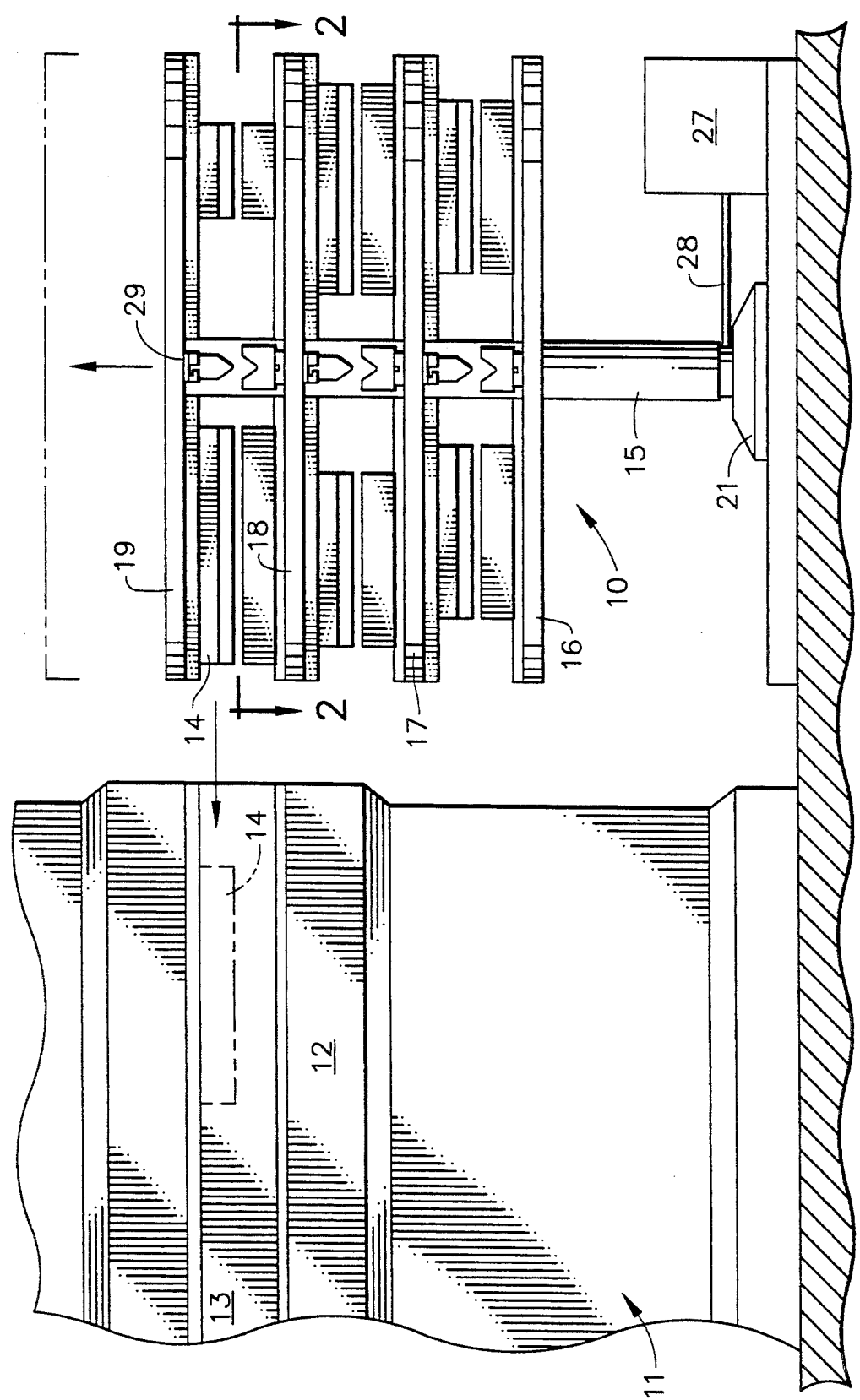
FIG. 1 is a side view of the storage rack of the invention positioned in operable association with a work press.

With reference to FIG. 1 there is shown the storage rack 10 of the invention. It is positioned next to a break press 11 so as to be in operable association therewith. The break press 11 is conventional in design. It includes upper and lower hydraulic members 12 and 13 which are capable of being forced together. Opposed die bolsters are mounted on each hydraulic member of the break press. The die bolsters extend horizontally and are capable of holding a single elongated die or several dies, either adjacent to one another or with breaks in between. The die bolsters are typically configured to receive the dies. Each die bolster has a channel to receive a longitudinally running rib on a backside of the die to properly hold it in position. As shown, a single die 14 (in phantom) is positioned in an upper die bolster. A mating die still in the storage rack is in position to be transferred to a lower die bolster directly underneath the upper die bolster.

The storage rack 10 comprises a hollow central shaft 15 with a set of horizontal tiers 16, 17, 18 and 19 fixedly secured to it. The central shaft is capable of vertical movement. A hydraulic lift means is operably associated with the central shaft 15 to effect the vertical movement. The central shaft 15 is also capable of manual rotational movement.

Figure 4:
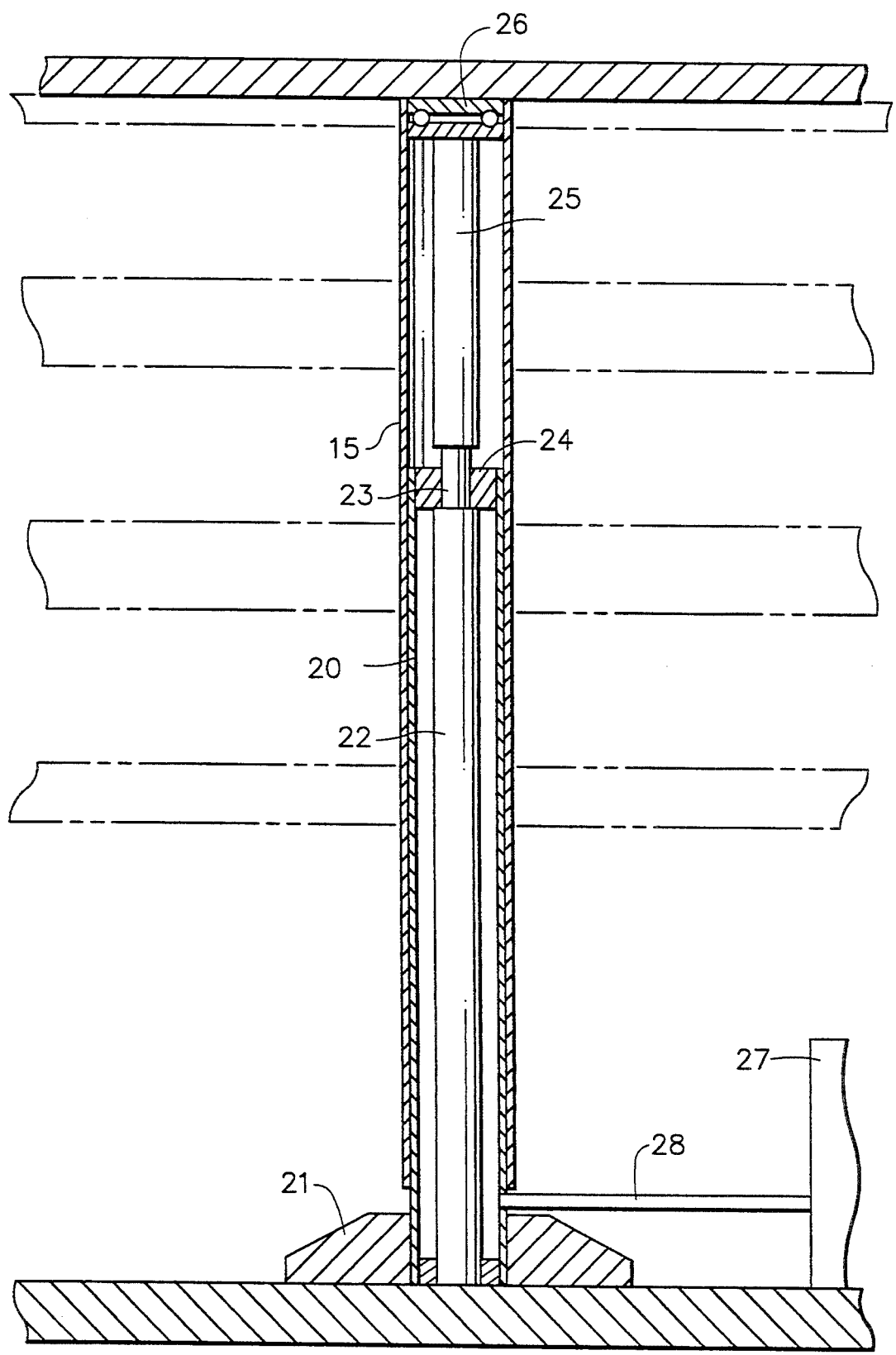
FIG. 4 is a side view partially in section of the storage rack of FIG. 1 showing its hydraulic lift means.

Hydraulic lift means generally are well known. They are configured and sized according to the function to be performed. Preferably, the hydraulic lift means used in the invention and as best seen in FIG. 4 uses a single acting linear actuator. Thus, the central shaft 15 with its tiers fixed thereto is slidably mounted for vertical movement over an inner guide tube 20. A base 21 holds the inner guide tube in a vertical position. The guide tube 20 houses a hydraulic cylinder 22. The hydraulic cylinder 22 has a fluid reservoir at its base, a piston operably associated with the fluid reservoir for vertical movement within the cylinder, and a piston rod for vertical movement therewith. The piston rod 23 of the hydraulic cylinder extends through a central opening in a rest block 24 mounted at the end of the cylinder. A connector rod 25 secured to the terminus of the piston rod 23 extends to a thrust bearing 26 mounted within the central shaft at its top end and to the top tier 19. Fluid under pressure is supplied by an electric powered hydraulic pump 27 through the fluid line 28 to the hydraulic cylinder 22.

The central shaft 15 is moved vertically by activating the hydraulic pump 27. Mechanical power from the pump is converted to fluid power, i.e. fluid moving under pressure. This pressurized fluid is transmitted to the piston, the piston rod 24 and ultimately the connector rod 25 to force the top tier 19 and consequently central shaft 15 upwardly. Release of the fluid pressure causes the central shaft and the tiers to move vertically downwardly by gravity. The rest block 24 at the end of the hydraulic cylinder 22 limits the downward travel of the connector rod 25 and the central shaft 15.

Again with reference to FIG. 1, the storage rack 10 has the four horizontal tiers 16–19 rigidly mounted on the central shaft 15 for vertical and rotational movement therewith. As few as two tiers can be mounted on the central shaft and as many tiers as possible given the particular plant's physical limitations and given the capability to effect movement of the tiers. For practical purposes, from about two to about eight tiers are preferred and from about two to about five tiers are more preferred. Each tier is substantially circular in shape and preferably ranges from about four feet to about ten feet in diameter.

At least two support rails 29 are mounted on a surface of each tier. As evident in FIGS. 1–3, each support rail 29 has two parallel longitudinally running rib members 30 with a channel 31 therebetween. The support rails 29 are configured to receive a die. The channel of a support rail for holding one of the dies in a suspended state is keyed (best seen in FIG. 1) to best hold it. The support rails all extend radially from a center point of the tier and have a length at least equal to the die it is to hold.

Figure 2:
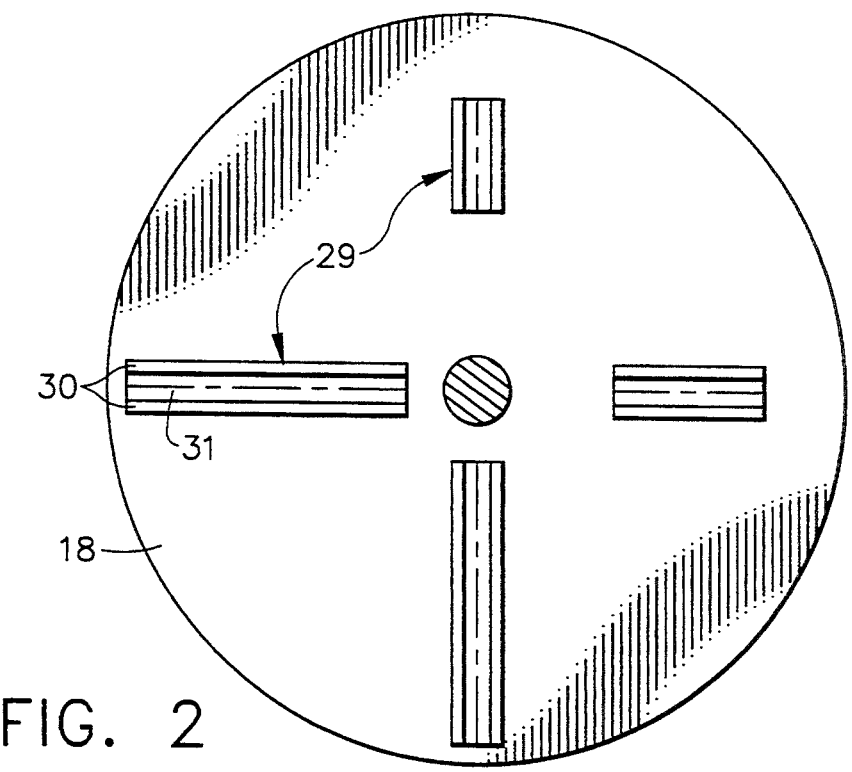
FIG. 2 is a plan view of one of the tiers of the storage rack of FIG. 1 showing four die support rails.
Figure 3:
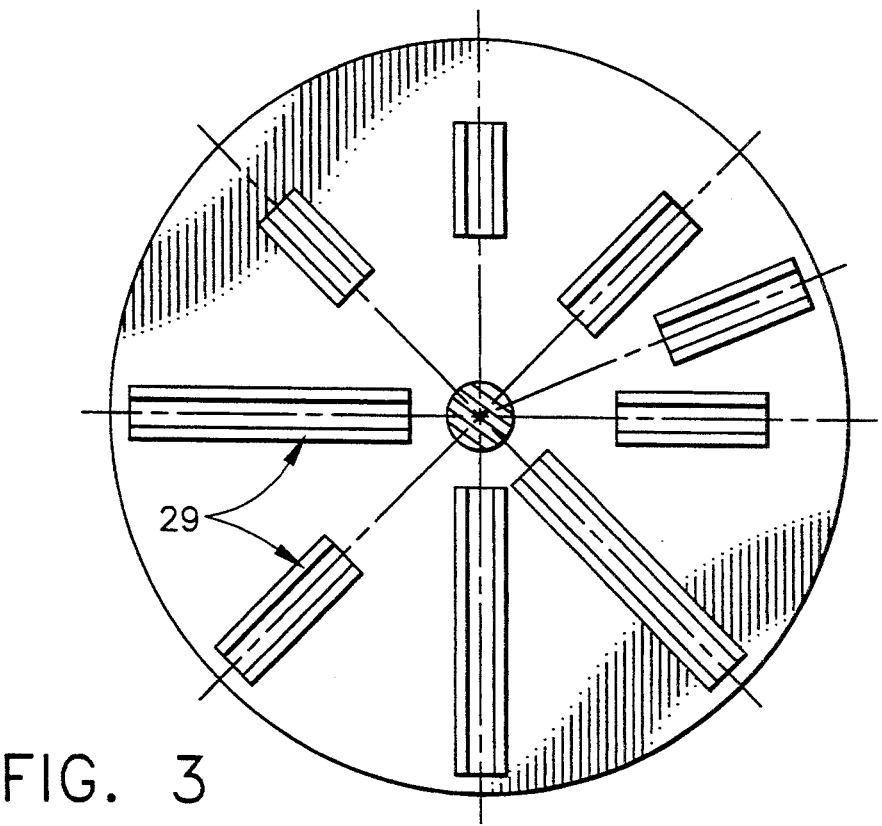
FIG. 3 is a plan view of another of the tiers of the storage rack of FIG. 1 showing nine die support rails.

As seen in FIGS. 2 and 3, the support rails 29 can be varying length, with a length about equal to the tier's radius being the maximum length. The number of support rails on each tier is also variable as can be seen in FIGS. 2 and 3. Typically, each tier has from about four to about ten support rails on a single surface. Removable retainer pins (not shown) are preferably positioned near an end of each support rail to hold a die in place during non-use.

Dies are stored in the storage rack in sets. That is, mating male and female dies are stored together, one above the other. The lowermost tier 16 has a set of support rails mounted on its top surface. The immediately adjacent second tier 17 has the same number of support rails mounted in the same positions on a bottom surface. This second tier 17 additionally has a set of support rails mounted on its top surface. The third tier 18 has support rails mounted in the same positions as the support rails on the second tier 17 immediately below. The uppermost tier 19 has support rails on its lower surface only. Again these support rails are positioned in accord with the positioning of the support rails on the tier immediately below it.

Die sets are readily transferred from the storage rack 10 to the break press 11. Initially, a tier with the selected die is vertically and rotationally moved until its support rail is in alignment with the die bolster. The retainer pin is removed and the die is simply slid directly in a substantially horizontal manner from the storage rack support rail to the die bolster. It is continually supported either fully or partially by a support rail and/or die bolster. Once transferred, the tier with the mating die is raised or lowered if needed to be in alignment with the other die bolster of the storage rack. It is then also slid from the storage rack to the break press.

In operation, the storage rack is initially positioned near the break press where it is to be used. It is loaded with die sets as needed. During use, a die set is initially selected for use. Each tier on which they are mounted is then separately vertically moved and rotationally moved to be in alignment with the break press die bolster. Each die is transferred and locked into position.

While the storage rack of the invention has been described in particularity and with reference to the drawings, it should be understood various modifications can be made. For example, the tiers can be rotationally mounted to the central shaft for rotational movement around the shaft. All modifications and changes of an obvious nature to the storage rack are considered within the scope of the appended claims.

We claim:

1. A storage rack for use with a break press, said storage rack capable of holding a plurality of dies in a manner whereby each die is positioned for ready transfer to a die bolster of the break press, said storage rack comprising:
   (a) a rotatable central shaft having hydraulic lift means operably associated therewith for vertical movement; and
   (b) a set of horizontal tiers, each said tier rigidly mounted to the central shaft for vertical movement therewith and for rotational movement therewith wherein each tier has at least two support rails mounted thereon and each support rail has two parallel longitudinally running rib members with a channel therebetween to slidably hold dies whereby a selected die on the storage rack is capable of being positioned juxtaposed the die bolster of the break press by vertical movement of the tier on which the selected die is held and rotational movement of said tier so that the die is readily slid substantially horizontally from the support rail to the die bolster.

2. The storage rack of claim 1 wherein from about two to about eight tiers are mounted on the central shaft.

3. The storage rack of claim 2 wherein from about two to about five tiers are mounted on the central shaft.

4. The storage rack of claim 2 wherein each tier has from about four to about ten support rails mounted thereon.

5. The storage rack of claim 4 wherein the lowermost tier has its support rails mounted on an upper surface, the uppermost tier has its support rails mounted on a lower surface and each intermediate tier has its support rails mounted on an upper surface and on a lower surface.

6. The storage rack of claim 1 wherein the tiers are fixedly secured to the central shaft and the shaft is rotatable.

7. A storage rack for use with a break press, said storage rack capable of holding a plurality of dies in a manner whereby each die is positioned for ready transfer to a die bolster of the break press, said storage rack comprising:
   (a) a central shaft having hydraulic lift means operably associated therewith for vertical movement and further wherein said central shaft is capable of rotational movement; and
   (b) from about two to about eight horizontal tiers, each said tier fixedly secured to the central shaft for vertical movement and rotational movement therewith, wherein each tier has from about four to about ten support rails mounted on a surface thereof to slidably hold dies whereby a selected die on the storage rack is capable of being positioned juxtaposed the die bolster of the break press by vertical movement of the tier on which the selected die is held and rotational movement of said tier so that the die is readily slid substantially horizontally from the support rail to the die bolster.

8. The storage rack of claim 7 wherein the lowermost tier has the support rails mounted on an upper surface, the uppermost tier has the support rails mounted on a lower surface and each intermediate tier has the support rails mounted on an upper surface and on a lower surface.

9. The storage rack of claim 8 wherein each support rail has two parallel longitudinally running rib members with a channel therebetween to slidably hold a die.

10. A storage rack for dies for use with a break press, wherein each die on the storage rack is held in a manner whereby it can be positioned for ready transfer to a die bolster of the break press, said storage rack comprising:
  (a) a central shaft capable of vertical and rotational movement; and
  (b) a set of horizontal tiers, each said tier rigidly mounted to the central shaft for vertical movement therewith and for rotational movement therewith wherein each tier has at least two support rails mounted thereon and each support rail has two parallel longitudinally running rib members with a channel therebetween to slidably hold a die whereby a selected die on the storage rack is capable of being positioned juxtaposed the die bolster of the break press by vertical movement of the tier on which the selected die is held and rotational movement of said tier so that the die is readily slid substantially horizontally from one of the support rails to the die bolster.

11. The storage rack of claim 10 wherein from about two to about eight tiers are mounted on the central shaft.

12. The Storage rack of claim 11 wherein from about two to about five tiers are mounted on the central shaft.

13. The storage rack of claim 12 wherein each tier has from about four to about ten support rails mounted thereon.

14. The storage rack of claim 13 wherein the lowermost tier has its support rails mounted on an upper surface, the uppermost tier has its support rails mounted on a lower surface and each intermediate tier has its support rails mounted on an upper surface and on a lower surface.

15. The storage rack of claim 14 wherein the central shaft has hydraulic lift means operably associated therewith for vertical movement.

* * * * *